No. 827,185. PATENTED JULY 31, 1906.
E. P. SAWTELLE.
EYEGLASSES.
APPLICATION FILED FEB. 26, 1906.

Witnesses:
Louis A. Jones
J. Ernest Ray

Inventor:
Elmer P. Sawtelle
by his attorney
Charles T. Gooding.

UNITED STATES PATENT OFFICE.

ELMER P. SAWTELLE, OF BOSTON, MASSACHUSETTS, ASSIGNOR OF ONE-HALF TO JOHN STEVENS, OF VALLEY CITY, NORTH DAKOTA.

EYEGLASSES.

No. 827,185.      Specification of Letters Patent.      Patented July 31, 1906.

Application filed February 26, 1906. Serial No. 302,868.

*To all whom it may concern:*

Be it known that I, ELMER P. SAWTELLE, a citizen of the United States, residing at Boston, in the county of Suffolk and State of Massachusetts, have invented new and useful Improvements in Eyeglasses, of which the following is a specification.

This invention relates to an improvement in eyeglasses; and the object of the invention is to provide a screw to fasten the spring and nose-guard to the stud or post, said screw so formed and arranged that it is prevented from working loose and coming out of place by a metal plate having engagement with said screw.

The invention consists in the arrangement and combination of parts set forth in the accompanying specification, and particularly pointed out in the claims thereof.

Figure 2:
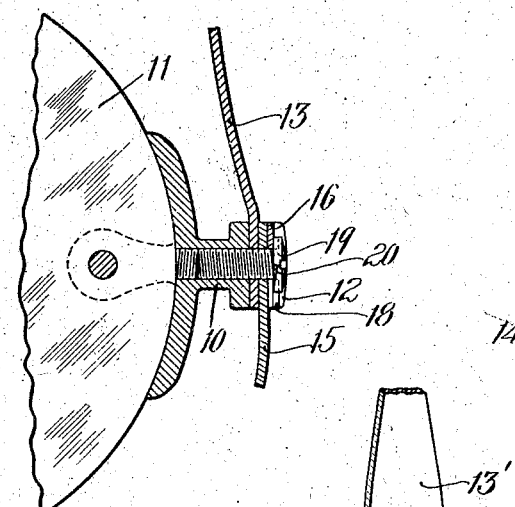
Figure 1:
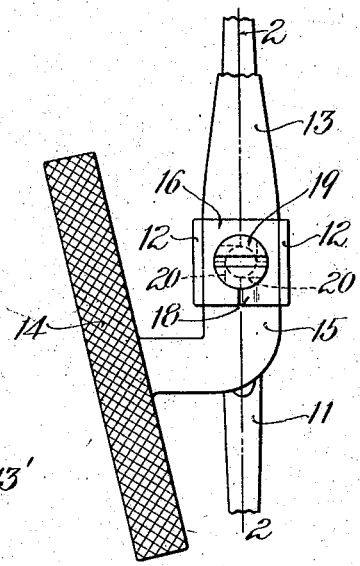
Figure 5:
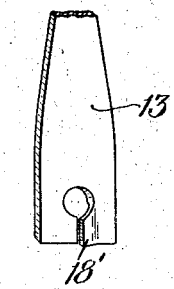
Figure 3:
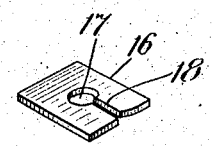
Figure 4:
Figure 6:
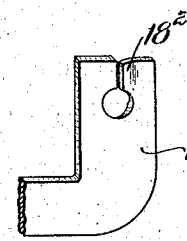

Referring to the drawings, Figure 1 is a detail elevation of a portion of a pair of eyeglasses, showing the nose guard or clip, the stud or post, and the spring partly broken away. Fig. 2 is a sectional elevation taken on line 2 2, Fig. 1, partly broken away. Fig. 3 is a detail perspective view of one form of locking-plate for locking the screw. Fig. 4 is a detail perspective view of one form of screw forming a part of a device of this invention. Fig. 5 is a detail perspective view of a modified form of locking-plate similar to that illustrated in Fig. 3, except that said locking-plate is formed integral with the spring. Fig. 6 is a detail perspective view of a second modified form of locking-plate, in which said locking-plate is formed integral with the nose guard or clip.

Like numerals refer to like parts throughout the several views of the drawings.

In the drawings, 10 is a stud or post to which a lens 11 is fastened in the usual manner, said stud being provided with two substantially parallel flanges 12 12, formed thereon. A spring 13 of any usual or desired construction, such as is used to connect the two lenses together, is adapted to engage the flanges 12 12 of the stud 10. A nose guard or clip 14 is provided with an arm 15, also adapted to engage the flanges 12 12 of the stud 10. A locking-plate 16 is provided with a perforation 17, formed therein, and is also provided with a split or bifurcation extending from said perforation to one edge thereof. A portion of the metal adjacent to said bifurcation is stuck up, forming a resilient tooth 18. The locking-plate 16 is adapted to fit closely between the flanges 12 12. A screw 19 passes through the perforation 17 of the locking-plate 16 and also through perforations in the arm 15 and nose-guard 14 and the spring 13, said screw having engagement with a tapped hole in the stud 10 and acting to clamp said locking-plate, nose-guard, and spring to said stud.

The screw 19 is provided with a plurality of depressions 20, formed in its head, each of which has a substantially radial surface and another surface intersecting said radial surface.

In assembling the device of my invention the spring 13 and the nose-guard 14 are first placed in position, and the locking-plate 16 is then put in place, and the screw 19 is next introduced, the locking-plate 16 being placed with its resilient tooth 18 toward the depressions 20 in the head of the screw 19. As the screw 19 is rotated to tighten it the resilient tooth 18 springs upwardly into the depressions 20 as they successively pass said tooth, and when said screw is finally as tight as desired the tooth 18 prevents said screw from backward rotation by reason of said tooth having engagement with one of the recesses 20.

If at any time it is desired to remove the screw 19, pressure may be exerted upon the tooth 18 by any suitable instrument, whereby it may be sprung out of contact with the depression 20, whereupon said screw may be unscrewed.

The use of the screw 19' is similar to that of the screw 19.

Referring now to Fig. 5, 13' is a modified form of spring provided with a resilient tooth 18', said tooth being formed similar to the tooth 18 of the locking-plate 16. In this form of my invention the locking-plate is formed integral with the spring 13' instead of being made a separate piece, and is therefore somewhat cheaper to manufacture and easier to assemble.

Referring now to Fig. 6, 14' is a modified form of nose guard or clip provided with a resilient tooth $18^2$, similar to the others hereinbefore described.

Having thus described my invention, what

I claim, and desire by Letters Patent to secure, is—

1. In a device of the character described, a lens-holding stud or post, a spring, a screw for clamping said spring to said stud, said screw having a rigid head provided with a depression in its under side, a locking-plate provided with a resilient tooth adapted to engage said depression, said tooth located beneath the head of said screw and projecting laterally therebeyond, and means for holding said plate against rotary movement.

2. In a device of the character described, a lens-holding stud or post provided with a flange thereon, a nose-guard adapted to engage said flange, a screw for clamping said nose-guard to said stud, said screw having a rigid head provided with a depression in its under side, and a locking-plate adapted to engage said flange, said locking-plate provided with a resilient tooth adapted to engage said depression, said tooth located beneath the head of said screw and projecting laterally therebeyond.

3. In a device of the character described, a lens-holding stud or post, a metal plate having a resilient tooth formed thereon, a screw for clamping said plate to said stud, said screw having a rigid head provided with a depression in its under side adapted to receive said tooth, and means for holding said plate against rotary movement, said resilient tooth being located beneath the head of said screw and projecting laterally therebeyond.

4. In a device of the character described, a lens-holding stud or post having flanges formed thereon, a metal plate adapted to engage said flanges, said plate having a resilient tooth formed thereon, and a screw for clamping said plate to said stud, said screw having a rigid head provided with a depression in its under side adapted to receive said tooth, said tooth being located beneath said head and projecting laterally therebeyond.

5. In a device of the character described, a lens-holding stud or post, a nose-guard, a screw for clamping said nose-guard to said stud, said screw having a rigid head provided with a plurality of depressions in its under side, a locking-plate provided with a resilient tooth adapted to engage one of said depressions, and means for holding said plate against rotary movement, said tooth being located beneath said head and projecting laterally therebeyond.

6. In a device of the character described, a lens-holding stud or post, a spring, a screw having a rigid head provided with a plurality of depressions in its under side, a locking-plate provided with a resilient tooth adapted to engage one of said depressions, and means for holding said plate against rotary movement, said resilient tooth being located beneath the head of said screw and projecting laterally therebeyond.

In testimony whereof I have hereunto set my hand in presence of two subscribing witnesses.

ELMER P. SAWTELLE.

Witnesses:
CHARLES S. GOODING,
LOUIS A. JONES.